United States Patent
Miyamoto (10) Patent No.: US 11,620,655 B2
(45) Date of Patent: Apr. 4, 2023

(54) CUSTOMER MANAGEMENT APPARATUS AND NON-TRANSITORY COMPUTER READABLE MEDIUM

(71) Applicant: FUJIFILM Business Innovation Corp., Tokyo (JP)

(72) Inventor: Soshi Miyamoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 256 days.

(21) Appl. No.: 17/027,717

(22) Filed: Sep. 22, 2020

(65) Prior Publication Data

US 2021/0264440 A1    Aug. 26, 2021

(30) Foreign Application Priority Data

Feb. 26, 2020   (JP) .............................. JP2020-030881

(51) Int. Cl.
   *G06F 11/00*   (2006.01)
   *G06Q 30/016*  (2023.01)
   *G06F 11/07*   (2006.01)

(52) U.S. Cl.
   CPC ....... *G06Q 30/016* (2013.01); *G06F 11/0736* (2013.01); *G06F 11/0751* (2013.01)

(58) Field of Classification Search
   CPC .......................... G06F 11/0736; G06F 11/0751
   USPC ...................................................... 714/1–57
   See application file for complete search history.

(56) References Cited

U.S. PATENT DOCUMENTS

| | | | | |
|---|---|---|---|---|
| 6,487,677 B1* | 11/2002 | Jantz | .................... | G06F 11/0793 714/48 |
| 7,664,991 B1* | 2/2010 | Gunda | ................ | G06F 11/1443 714/43 |
| 9,037,914 B1* | 5/2015 | Au | ...................... | G06F 11/0793 714/38.14 |
| 2007/0022327 A1* | 1/2007 | Otsuka | ................ | G06F 11/3419 714/47.2 |
| 2007/0168715 A1* | 7/2007 | Herz | .................... | G06F 11/1461 714/13 |
| 2007/0180309 A1* | 8/2007 | Zohar | ..................... | G06F 3/067 714/6.12 |
| 2008/0016214 A1* | 1/2008 | Galluzzo | ................. | H04L 67/14 709/226 |
| 2011/0029817 A1* | 2/2011 | Nakagawa | .......... | G06F 11/0709 714/E11.029 |
| 2013/0246859 A1* | 9/2013 | Wang | .................... | G06F 11/3409 714/47.1 |
| 2014/0330742 A1* | 11/2014 | Jacobs | ................... | G06Q 30/02 705/344 |
| 2014/0365659 A1* | 12/2014 | Schmidt | ................. | H04L 67/63 709/226 |

(Continued)

FOREIGN PATENT DOCUMENTS

JP        2014174698       9/2014

*Primary Examiner* — Sarai E Butler
(74) *Attorney, Agent, or Firm* — JCIPRNET (57) ABSTRACT

A customer management apparatus includes a detector that detects occurrence of a failure, memory that stores customer information, and a processor. The processor is configured to, by running a program, calculate a number of accesses made by each customer at time of occurrence of a failure when the detector detects the occurrence of the failure, and output, based on the number of accesses, priorities of customers who are to be taken care of when a failure occurs, the priorities being stored in the memory.

14 Claims, 6 Drawing Sheets

| CUSTOMER ID | NUMBER OF ACCESSES IN PAST MONTH | CONTRACT START DATE | TRIAL USE FLAG | NUMBER OF ACCESSES AT LAST FAILURE |
|---|---|---|---|---|
| c21a9801 | 3 | 1/10/2019 | NO | 3 |
| c21a9802 | 10 | 10/12/2018 | NO | — |
| c21a9803 | 20 | 8/12/2019 | YES | 2 |
| c21a9804 | 5 | 3/4/2019 | YES | — |
| . . . | | . . . | | |

(56) References Cited

U.S. PATENT DOCUMENTS

2016/0277970 A1* 9/2016 Werneke ............. H04W 12/084
2017/0329695 A1* 11/2017 Bhole ................. G06F 11/3612

* cited by examiner

| NUMBER OF ACCESSES IMMEDIATELY BEFORE FAILURE | NUMBER OF POINTS |
|---|---|
| 1 | 2 |
| 2 | 4 |
| 3 | 8 |
| ... | ... |

FIG. 3

| NUMBER OF ACCESSES IN PAST MONTH | NUMBER OF POINTS |
|---|---|
| 5 OR LESS | 1 |
| 10 OR LESS | 2 |
| 15 OR LESS | 3 |
| ... | ... |

FIG. 4

| CONTRACT PERIOD | TRIAL CUSTOMER | NUMBER OF POINTS |
|---|---|---|
| 1 MONTH OR LESS | YES | 10 |
| 1 MONTH OR LESS | NO | 5 |
| 3 MONTHS OR LESS | YES | 8 |
| 3 MONTHS OR LESS | NO | 4 |
| 15 MONTHS OR LESS | YES | 6 |
| 15 MONTHS OR LESS | NO | 3 |
| ... | | ... |

FIG. 5

| CUSTOMER ID | NUMBER OF ACCESSES IN PAST MONTH | CONTRACT START DATE | TRIAL USE FLAG | NUMBER OF ACCESSES AT LAST FAILURE |
|---|---|---|---|---|
| c21a9801 | 3 | 1/10/2019 | NO | 3 |
| c21a9802 | 10 | 10/12/2018 | NO | — |
| c21a9803 | 20 | 8/12/2019 | YES | 2 |
| c21a9804 | 5 | 3/4/2019 | YES | — |
| ... | | ... | | |

FIG. 6

| CUSTOMER ID | SALES REPRESENTATIVE ID |
|---|---|
| c21a9801 | o30b1234 |
| c21a9802 | o30b1235 |
| c21a9803 | o30b1235 |
| c21a9804 | o30b1236 |
| ... | ... |

FIG. 7

| DATE | INCIDENT ID | CONTENT OF INCIDENT | INQUIRY |
|---|---|---|---|
| 03-22-2019 16:32 | 00000001 | COMMUNICATION FAILURE | NO |
| 04-01-2019 14:32 | 00000002 | COMMUNICATION FAILURE | NO |
| 04-12-2019 10:20 | 00000003 | COMMUNICATION FAILURE | YES |
| 04-30-2019 18:10 | 00000004 | COMMUNICATION FAILURE | YES |
| ... | | ... | |

FIG. 8

| INCIDENT ID | CUSTOMER ID | NUMBER OF ACCESSES AT FAILURE | CONTRACT PERIOD | NUMBER OF ACCESSES IN PAST MONTH | TRIAL |
|---|---|---|---|---|---|
| 00000003 | c21a9801 | 3 | 1 MONTH | 3 | NO |
| 00000003 | c21a9802 | 6 | 2 MONTH | 10 | YES |
| ... | ... | | | | |

CUSTOMER MANAGEMENT APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-030881 filed Feb. 26, 2020.

BACKGROUND

(i) Technical Field

The present disclosure relates to a customer management apparatus and a non-transitory computer readable medium.

(ii) Related Art

When a failure occurs in a computer system, it is necessary to recover from the failure and promptly take care of customers who use the computer system.

Japanese Unexamined Patent Application Publication No. 2014-174698 describes an incident deadline management system that includes, in order to automatically set the priorities of incidents, a priority setting database including a basic setting table and a per-customer priority setting table. In the basic setting table, priority points are set, and the priority points includes a plurality of service level agreement (SLA)-compliance-rate points, each of which is set in accordance with an SLA compliance rate, a plurality of number-of-failure points, each of which is set in accordance with the number of failures that have occurred, and a plurality of number-of-contract points, each of which is set in accordance with the number of contracts. In the per-customer priority setting table, a per-customer priority point that is the sum of an SLA-compliance-rate point, a number-of-failure point, and a number-of-contract point, which are respectively set on the basis of an SLA compliance rate, the number of failures that have occurred, and the number of contracts, is stored on a customer-by-customer basis. The incident deadline management system calculates a per-customer priority point by comparing a SLA-compliance-rate point, a number-of-failure points, and a number-of-contract point, which are set in the basic setting table, an SLA compliance rate, which is stored in an SLA contract information database, the number of failures that have occurred, which is stored in a failure history database, and the number of contracts, which is stored in a configuration management database.

In the system described in Japanese Unexamined Patent Application Publication No. 2014-174698, a customer who has a high support priority is extracted by using a plurality of points (or parameters) such as an SLA-compliance-rate point and a number-of-failure point. However, since predetermined static parameters are used, it is difficult to dynamically change a support priority in accordance with a failure.

SUMMARY

Aspects of non-limiting embodiments of the present disclosure relate to providing a technology capable of dynamically extracting a customer who has a high support priority in accordance with a failure.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a customer management apparatus including a detector that detects occurrence of a failure, memory that stores customer information, and a processor. The processor is configured to, by running a program, calculate the number of accesses made by each customer at time of occurrence of a failure when the detector detects the occurrence of the failure, and output, based on the number of accesses, priorities of customers who are to be taken care of when a failure occurs, the priorities being stored in the memory.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will be described below with reference to the drawings.
<Basic Principle>

The basic principle of the present exemplary embodiment will be described first.

In a system of the related art, for example, although a customer who has a high support priority is extracted by using a plurality of parameters such as an SLA-compliance-rate point and a number-of-failure point, since these parameters are predetermined static parameters, it is difficult to dynamically change a support priority in accordance with a failure. For example, there may be a case where the priority of a specific customer should be raised depending on a failure situation. However, it is difficult to take such measures with only static parameters. More specifically, when a failure has occurred in a computer system, and failure recovery has not yet been accomplished, that is, when it has been taking a long time for the computer system to recover from the failure, it is necessary to promptly take care of a customer who is trying to access to and use the system more frequently than the other customers, and thus, it is presumed that the support priority of the customer should be raised. However, it is difficult to take such measures with only static parameters.

Accordingly, in the present exemplary embodiment, a configuration is employed in which the support priority of a customer is set and output by using a dynamic parameter associated with occurrence of a failure, that is, the number of accesses at the time of occurrence of a failure. A relatively high support priority is given to a customer who accesses to the system relatively frequently at the time of occurrence of a failure, and a relatively low support priority is given to a customer who accesses to the system relatively less frequently at the time of the occurrence of the failure.

Here, the wording "the number of accesses at the time of occurrence of a failure" refers to the number of accesses associated with occurrence of a failure. The number of accesses associated with occurrence of a failure may be the number of accesses before or after occurrence of a failure. In other words, the number of accesses associated with occurrence of a failure includes not only the number of accesses made after a failure has occurred but also the number of accesses made before the failure occurs. However, when the timing at which a failure occurs serves as a base point, the number of accesses within a predetermined period of time before and after the base point may be associated with the occurrence of the failure. Examples of the number of accesses that is to be associated with occurrence of a failure include the number of accesses within three hours after a failure has occurred, the number of accesses made until the system recovers from a failure, the number of accesses within one hour before a failure occurs, and the number of accesses within two hours before a failure occurs.

In addition, the number of accesses associated with occurrence of a failure is not limited to a failure that most recently occurred and may be the number of accesses associated with a failure that had occurred prior to the most recently occurred failure. For example, the number of accesses associated with the occurrence of the failure may be the number of accesses made after a failure has occurred, the failure being the last one of a plurality of failures occurred prior to the most recently occurred failure (hereinafter referred to as "the last failure").

Accordingly, in the present exemplary embodiment, the number of accesses at the time of occurrence of a failure includes the following.

(1) the number of accesses within a predetermined period of time after the most recently occurred failure (2) the number of accesses within a predetermined period of time before the most recently occurred failure (3) the number of accesses within a predetermined period of time after the last failure that had occurred prior to the most recently occurred failure In the present exemplary embodiment, the support priority of a customer is set by solely using one of the above numbers of accesses or by combining two or more of the above numbers of accesses. Examples of a method for setting a support priority are as follows.

Use only (1)
Use only (2)
Use only (3)
Use (1) and (2)
Use (1) and (3)
Use (2) and (3)
Use (1), (2), and (3)

A support priority may be calculated by using a score calculated by performing weighted addition of the above numbers of accesses. In other words, when weights are p, q, and r, a score may be calculated by using the following formula:

score=$p$·(number of accesses after most recently occurred failure)+$q$·(number of accesses before most recently occurred failure)+$r$·(number of accesses after last failure), where $p \geq 0$, $q \geq 0$, and $r \geq 0$.

In particular, when placing importance on the number of accesses made before the most recently occurred failure, the weights p and r are each set to 0, and a score may be calculated by using the following formula:

score=$q$·(number of accesses before most recently occurred failure).

Obviously, the weighted addition is an example, and a score may be calculated by using an arbitrary function using the above numbers of accesses (1) to (3) as variables.

In the present exemplary embodiment, a support priority is set by using the dynamic parameters (1) to (3), and a support priority may be set by combining additional parameters other than these parameters. Examples of additional parameters other than the above parameters include the following.

the number of accesses within a predetermined period of time in the past
contract period
determination of whether regular customer or trial customer
the duration of time over which failure recovery is not accomplished These parameters may each be solely used or may be suitably combined and used. In addition, these parameters may be used for adjusting the above-mentioned weights p, q, and r. Examples of adjustments of the weights are as follows. The weight q is increased as the number of accesses within a predetermined period of time in the past becomes larger. The weight q is increased as a contract period becomes shorter. The weight q is increased in the case of a trial customer. The weight q is increased as the duration of time over which failure recovery is not accomplished becomes longer.

Regarding the duration of time over which failure recovery is not accomplished, when the system has not been recovered from a failure for a long period of time, it is presumed that a customer who uses the service more frequently is more affected by the failure than the other customers are and needs to be given a higher support priority. Thus, when the system has not been recovered from a failure for a long period of time, it seems to be reasonable to increase the weight q so as to raise the priority of such a customer who has accessed to the system a large number of times immediately before the occurrence of the failure, and the support priority may be dynamically changed in accordance with the failure situation.

In addition, a score may be calculated by focusing on not only the number of accesses made in the period of time during which failure recovery is not accomplished but also the number of accesses made after the failure recovery has been accomplished. This is because the support priority of a customer who accesses to the system more frequently after failure recovery has been accomplished needs to be raised afterward.

The present exemplary embodiment will now be described more specifically.

<Basic Configuration>

Figure 1:
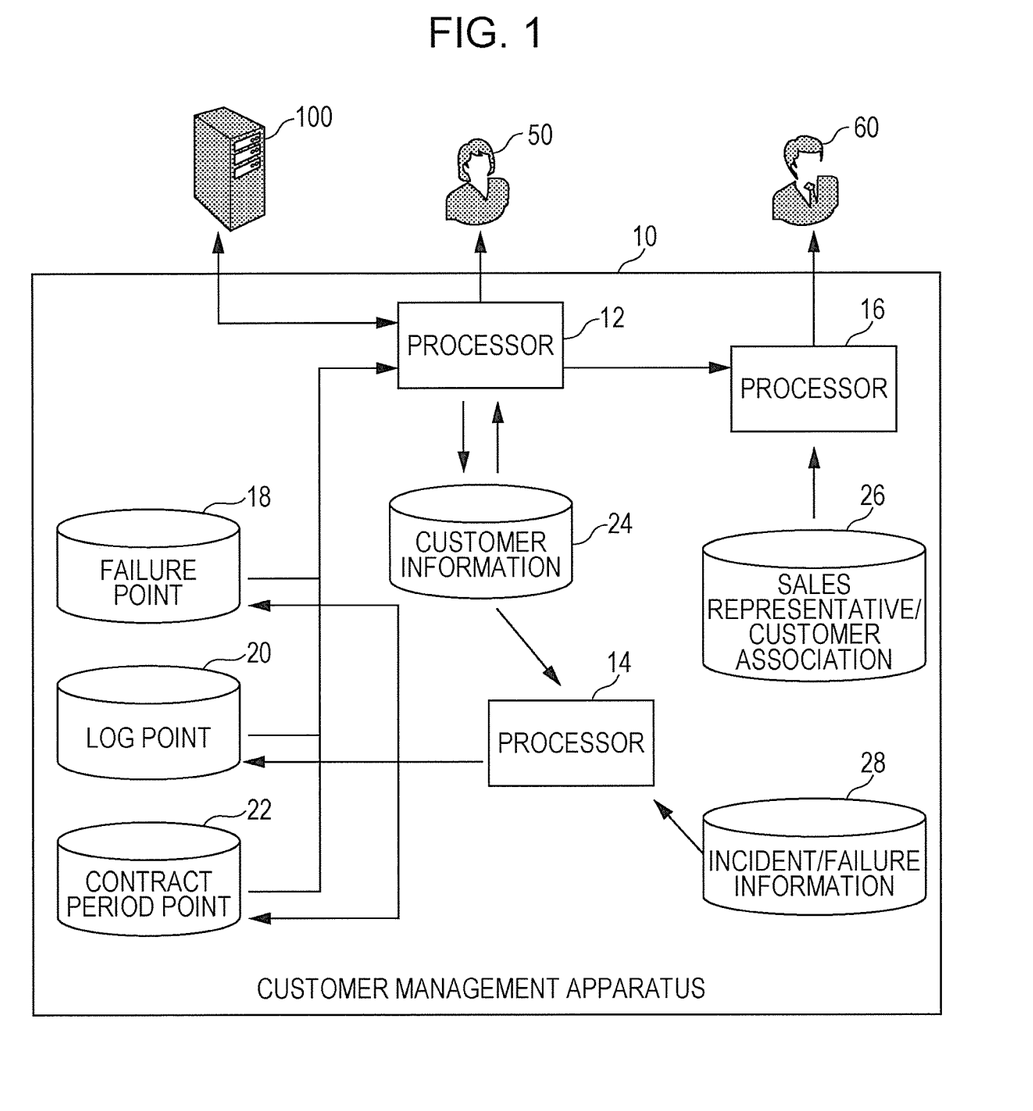
FIG. 1 is a diagram illustrating a configuration of a customer management apparatus in the exemplary embodiment.

FIG. 1 is a diagram illustrating the configuration of a customer management apparatus 10 in the present exemplary embodiment. The customer management apparatus 10 includes a plurality of processors 12, 14, and 16, a failure point table database 18, a log point table database 20, a contract period point table database 22, a customer information table database 24, a sales representative/customer association table database 26, and an incident/failure information table database 28. The customer management apparatus 10 may be formed of a computer that includes a processor, a memory, an input/output interface, and a communication interface.

The processor 12 calculates the support priority of each customer, that is, the priority that is given to each customer by using information regarding a system (or a server) 100 that provides a service to be used by the customers and information regarding the databases 18 to 24. The processor 12 outputs the priority of each customer to a person 50 who is in charge of the operation of the system 100 so as to remind the person 50 of the priorities.

The processor 14 sets weights that are used in score calculation by using information regarding the customer information table database 24 and information regarding the incident/failure information table database 28.

The processor 16 alerts a sales representative 60 who is in charge of a customer who has a high support priority by using information obtained from the processor 12 and information regarding the sales representative/customer association table database 26.

The failure point table database 18 is memory that stores a table in which the number of accesses made immediately before a failure occurs in the system 100 is associated with the number of points. The number of accesses immediately before occurrence of a failure specifically refers to the number of accesses made one hour or two hours before a failure occurs. Although the number of points associated with the number of accesses is arbitrary, the number of points is set to increase as the number of accesses becomes larger.

The log point table database 20 is memory that stores a table in which the number of accesses to the system 100 in the past month is associated with the number of points. Although the number of points associated with the number of accesses is arbitrary, the number of points is set to increase as the number of accesses becomes larger.

The contract period point table database 22 is memory that stores a table in which a contract period of the service provided by the system 100 is associated with the number of points. Although the number of points associated with a contract period is arbitrary, the number of points is set to decrease as the contract period becomes longer.

The customer information table database 24 is memory that stores a table in which the number of accesses made by each customer to the system 100 in the past month, a contract start date, the use or disuse of a trial version, and the number of accesses at the time of occurrence of the last failure are associated with one another. The number of accesses at the time of occurrence of the last failure is the number of accesses made (within a predetermined period of time) after occurrence of the last failure, which is the last one of the failures occurred prior to the most recently occurred failure.

The sales representative/customer association table database 26 is memory that stores a table in which a customer of the system 100 is associated with a sales representative.

The incident/failure information table database 28 stores a first table and a second table. The first table is a table in which a date, an incident (a failure), the content of an incident, and the presence or absence of an inquiry are associated with one another. The second table is a table in which an incident, a customer, the number of accesses at the time of occurrence of a failure, a contract period, the number of logins in the past month, and the use or disuse of a trial version are associated with one another. The number of accesses at the time of occurrence of a failure is the number of accesses (within a predetermined period of time) after the most recently occurred failure.

When the processor 12 detects an incident (failure) occurred in the system, the processor 12 outputs the occurrence of the incident to the processor 14. When the processor 14 detects the incident in the system 100 as a result of the output by the processor 12, the processor 14 registers the date on which the incident occurred, the identification number (ID) of the incident, and the content of the incident in the first table and also registers the presence or absence of an inquiry regarding the incident such that the presence or absence of an inquiry is linked to the incident. In addition, when the processor 14 receives an inquiry, the processor 14 refers to the customer information table stored in the customer information table database 24 and updates the second table.

Each of the processors 12, 14, and 16 performs processing by reading and running a program stored in the memory. In the present exemplary embodiment, although the processors 12, 14, and 16 are provided independently of one another, the processors 12, 14, and 16 may be constructed by a single processor.

In the present exemplary embodiment, each of the processors 12, 14, and 16 is hardware in a broad sense. Examples of the processor include general processors (e.g., CPU: Central Processing Unit), and dedicated processors (e.g., GPU: Graphics Processing Unit, ASIC: Application Integrated Circuit, FPGA: Field Programmable Gate Array, and programmable logic device). In the present exemplary embodiment, each of the processors 12, 14, and 16 may be one processor or plural processors in collaboration which are located physically apart from each other but may work cooperatively. The order of operations of each of the processors 12, 14, and 16 is not limited to one described in the present exemplary embodiment and may be changed.

Figure 2:
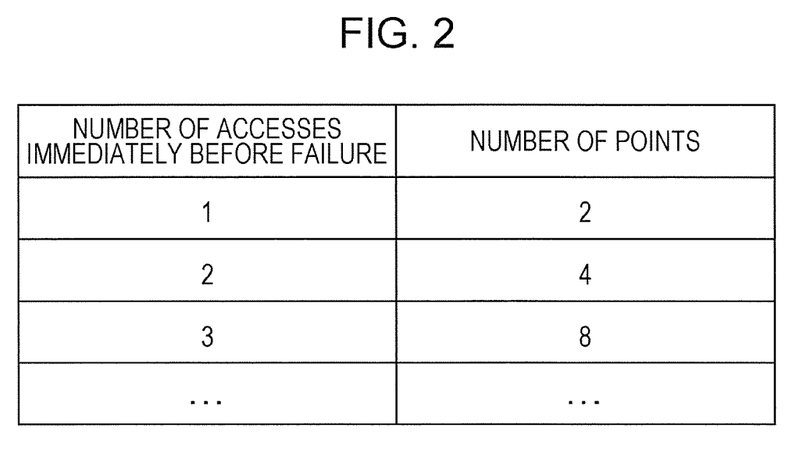
FIG. 2 is a diagram illustrating a failure point table in the exemplary embodiment.

FIG. 2 illustrates an example of a failure point table stored in the failure point table database 18. In the failure point table, the number of accesses made immediately before (one hour or two hours before) a failure occurs and the number of points are associated with each other. An example of the failure point table is as follows.

| Number of Accesses Immediately Before Failure | Number of Points |
| --- | --- |
| 1 | 2 |
| 2 | 4 |
| 3 | 8 |

By referencing to the above table, the point corresponding to the number of accesses immediately before occurrence of a failure may be calculated. Note that the number of points is set to increase as the number of accesses immediately before occurrence of a failure becomes larger because, when the number of accesses made by a customer is large, it is very likely that the customer desires to use the service immediately, and thus, the point is increased by taking this fact into consideration. The number of accesses made after occurrence of a failure and the number of points are also associated with each other in the table illustrated in FIG. 2.

Figure 3:
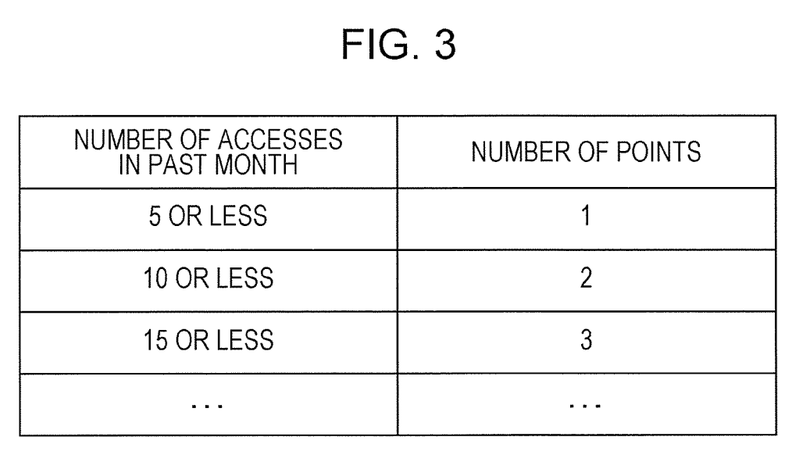
FIG. 3 is a diagram illustrating a log point table in the exemplary embodiment.

FIG. 3 illustrates an example of a log point table stored in the log point table database 20. In the log point table, the number of accesses in the past month and the number of points are associated with each other. An example of the log point table is as follows.

| Number of Accesses in Past Month | Number of Points |
|---|---|
| 5 or Less | 1 |
| 10 or Less | 2 |
| 15 or Less | 3 |

By referencing to the above table, the point corresponding to the number of accesses in the past month may be calculated. Note that the number of points is set to increase as the number of accesses in the past month becomes larger because a large number of accesses made by a customer indicates that the customer has been active and has frequently used the service provided by the system 100, and thus, the point is increased by taking this fact into consideration.

Figure 4:
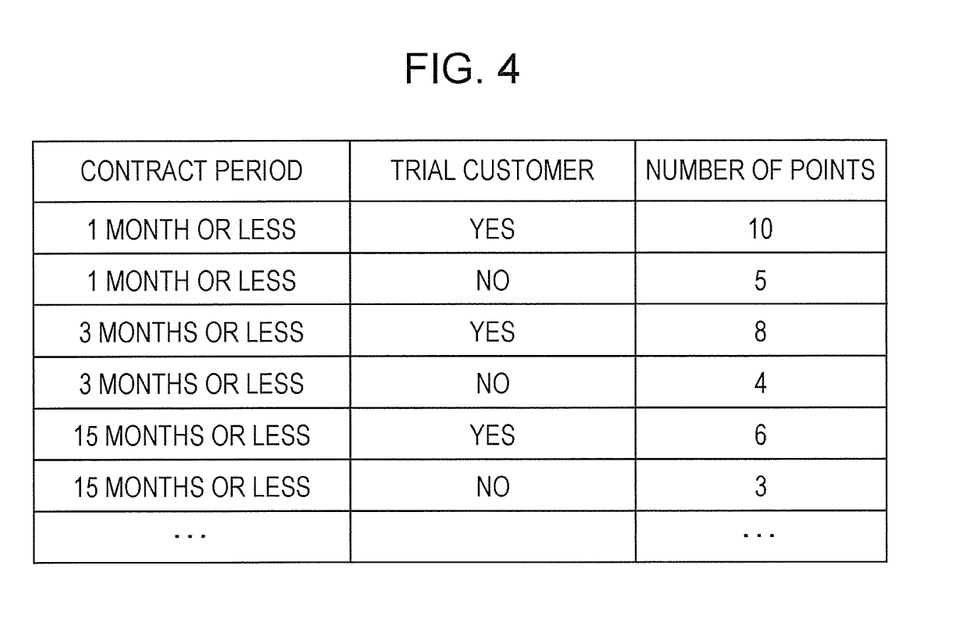
FIG. 4 is a diagram illustrating a contract period point table in the exemplary embodiment.

FIG. 4 illustrates an example of a contract period point table stored in the contract period point table database 22. In the contract period point table, the length of a contract period, determination of whether a customer uses a trial version, and the number of points are associated with each other. An example of the contract period point table is as follows.

| Contract Period | Trial Customer | Number of Points |
|---|---|---|
| 1 Month or Less | YES | 10 |
| 1 Month or Less | NO | 5 |
| 3 Months or Less | YES | 8 |
| 3 Months or Less | NO | 4 |
| 15 Months or Less | YES | 6 |
| 15 Months or Less | NO | 3 |

By referencing to the above table, the point corresponding to a contract period and determination of whether a customer uses a trial version may be calculated. Note that the number of points is set to increase as a contract period becomes shorter because it is more likely that a customer is new as a contract period becomes shorter, and accordingly, there is a high risk that the customer will cancel the service provided by the system 100. Thus, the point is increased by taking this fact into consideration. In addition, the reason why the number of points is set to be large in the case of a trial customer is because a trial customer is very likely to become a new customer, and thus, the point is increased by taking this fact into consideration.

Figure 5:
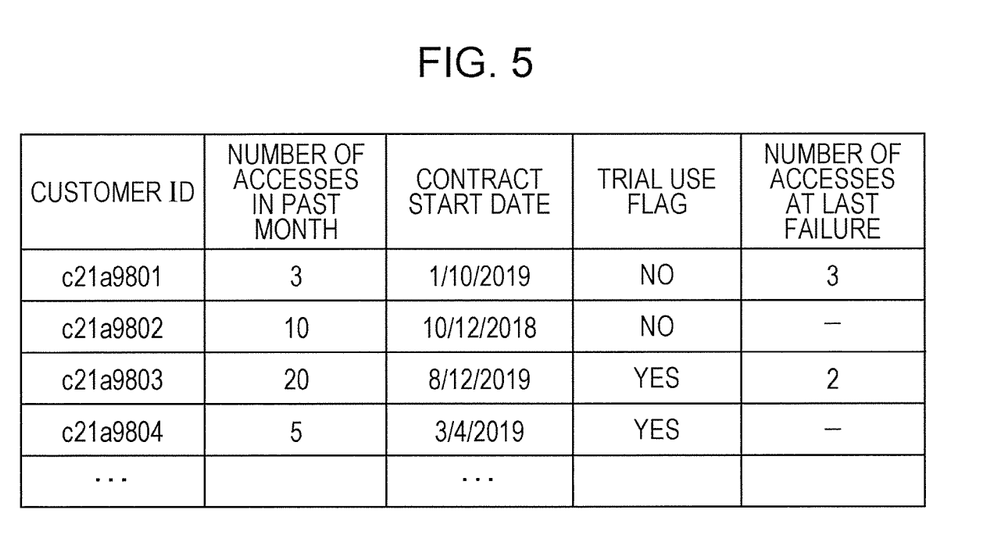
FIG. 5 is a diagram illustrating a customer information table in the exemplary embodiment.

FIG. 5 illustrates an example of a customer information table stored in the customer information table database 24. In the customer information table, a customer ID, the number of accesses in the past month, a contract start date, a trial use flag, and the number of accesses at the time of occurrence of the last failure are associated with one another. In other words, the number of accesses in the past month, a contract start date, a trial use flag, and the number of accesses at the time of occurrence of the last failure are associated with one another for each customer. The contract period of each customer at the time of occurrence of a failure in the system 100 is calculated by referencing to a contract start date. In addition, by referencing to a trial use flag, it is determined whether each user has been using a trial version at the time of occurrence of a failure in the system 100. When a trial use flag is NO, this indicates that a customer is not a trial customer but a regular customer, and when a trial use flag is YES, this indicates that a customer is a trial customer. The number of accesses at the time of occurrence of the last failure is the number of accesses made within a predetermined period of time after occurrence of the last failure, which is the last one of the failures occurred prior to the most recently occurred failure. An example of the customer information table for a customer whose customer ID is c21a9801 is as follows.

| Number of Accesses in Past Month | Contract Start Date | Trial Use Flag | Number of Accesses at Last Failure |
|---|---|---|---|
| 3 | 2019 Jan. 10 | NO | 3 |

Figure 6:
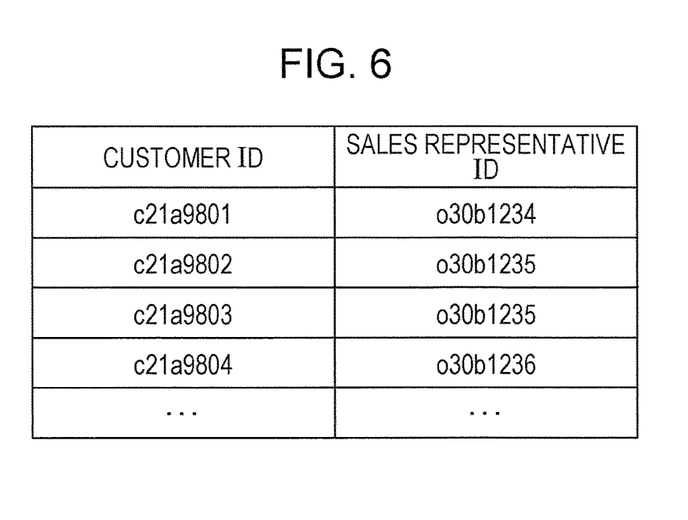
FIG. 6 is a diagram illustrating a sales representative/customer association table in the exemplary embodiment.

FIG. 6 illustrates an example of a sales representative/customer association table stored in the sales representative/customer association table database 26. In the sales representative/customer association table, a customer and a sales representative who is in charge of the customer are associated with each other. An example of the sales representative/customer association table is as follows.

| Customer ID | Sales Representative ID |
|---|---|
| C21a9801 | 030b1234 |

Note that the contact information (such as an e-mail address and a telephone number) of a sales representative may be managed in a separate table.

Figure 7:
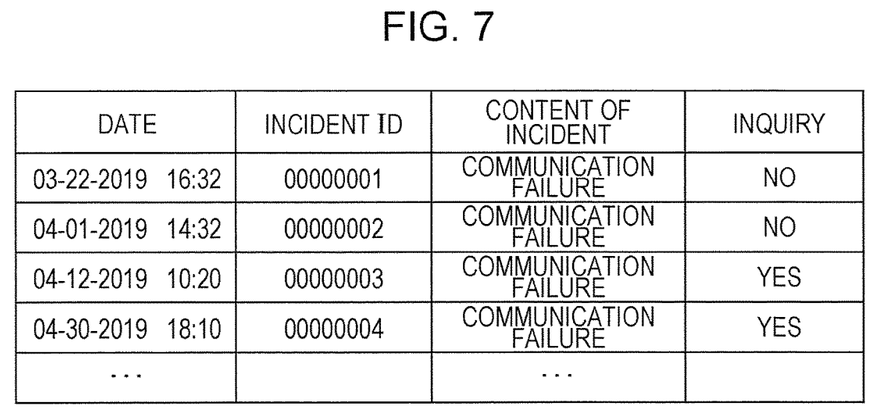
FIG. 7 is a diagram illustrating a first incident/failure information table in the exemplary embodiment.

FIG. 7 illustrates an example of the first table stored in the incident/failure information table database 28. In the first table, incident date and time, an incident (failure) ID, the content of an incident (failure), and the presence or absence of an inquiry are associated with one another. An example of the first table is as follows.

| Date | Incident ID | Content of Incident | Inquiry |
|---|---|---|---|
| 2019 Mar. 22 16:32 | 00000001 | Communication Failure | NO |

When the processor 12 detects a failure in the system 100, the processor 14 registers the above items in the first table by using detection information. Note that an administrator of the system 100 may manually input and register the above items.

Figure 8:
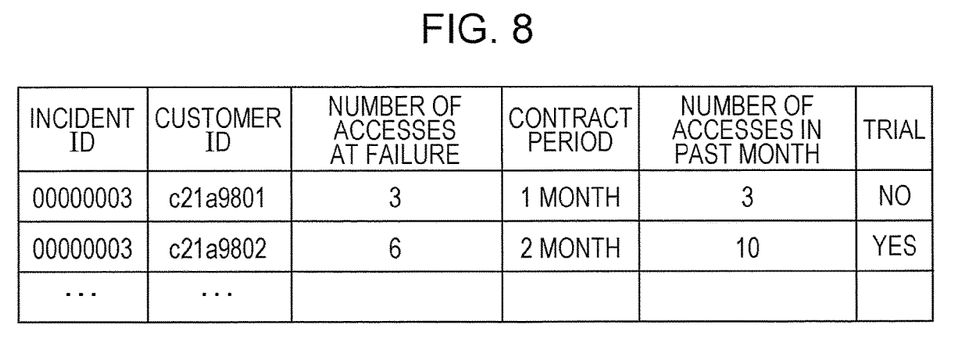
FIG. 8 is a diagram illustrating a second incident/failure information table in the exemplary embodiment.

FIG. 8 illustrates an example of the second table stored in the incident/failure information table database 28. In the second table, the number of accesses at the time of occurrence of a failure, a contract period, the number of accesses in the past month, determination of whether a customer uses a trial version are associated with one another for each incident (failure) and each customer. The processor 14 generates this second table by adding up the first table illustrated in FIG. 7, the customer information table illustrated in FIG. 5, and the number of accesses within a predetermined period of time after the most recently occurred failure and stores the second table in the incident/failure information table database 28. For example, when the incident ID of the most recently occurred failure is 00000003, an example of the second table is as follows.

| Customer ID | Number of Accesses at Failure | Contract Period | Number of Accesses in Past Month | Trial |
|---|---|---|---|---|
| c21a9801 | 3 | 1 Month | 3 | No |

Note that the number of accesses at the time of occurrence of a failure is the number of accesses within a predetermined period of time after a failure has occurred. Along with this number of accesses, the number of accesses within a predetermined period of time immediately before the occurrence of the failure and the number of accesses at the time of occurrence of the last failure may be registered. The number of accesses at the time of occurrence of the last failure may be acquired by referencing to the customer information table illustrated in FIG. 5. The processor 14 may acquire the following information items for each customer by referencing to the second table.

the number of accesses within a predetermined period of time immediately before occurrence of a failure the number of accesses within a predetermined period of time after occurrence of a failure the number of accesses within a predetermined period of time at the time of occurrence of the last failure the number of accesses within a predetermined period of time in the past month contract period use or disuse of a trial version Note that since incident date and time are registered in the first table, which is stored in the incident/failure information table database 28, as mentioned above, the processor 14 may acquire, in addition to the above information items, information regarding the duration of time over which failure recovery is not accomplished by referencing to incident date and time.

Figure 9:
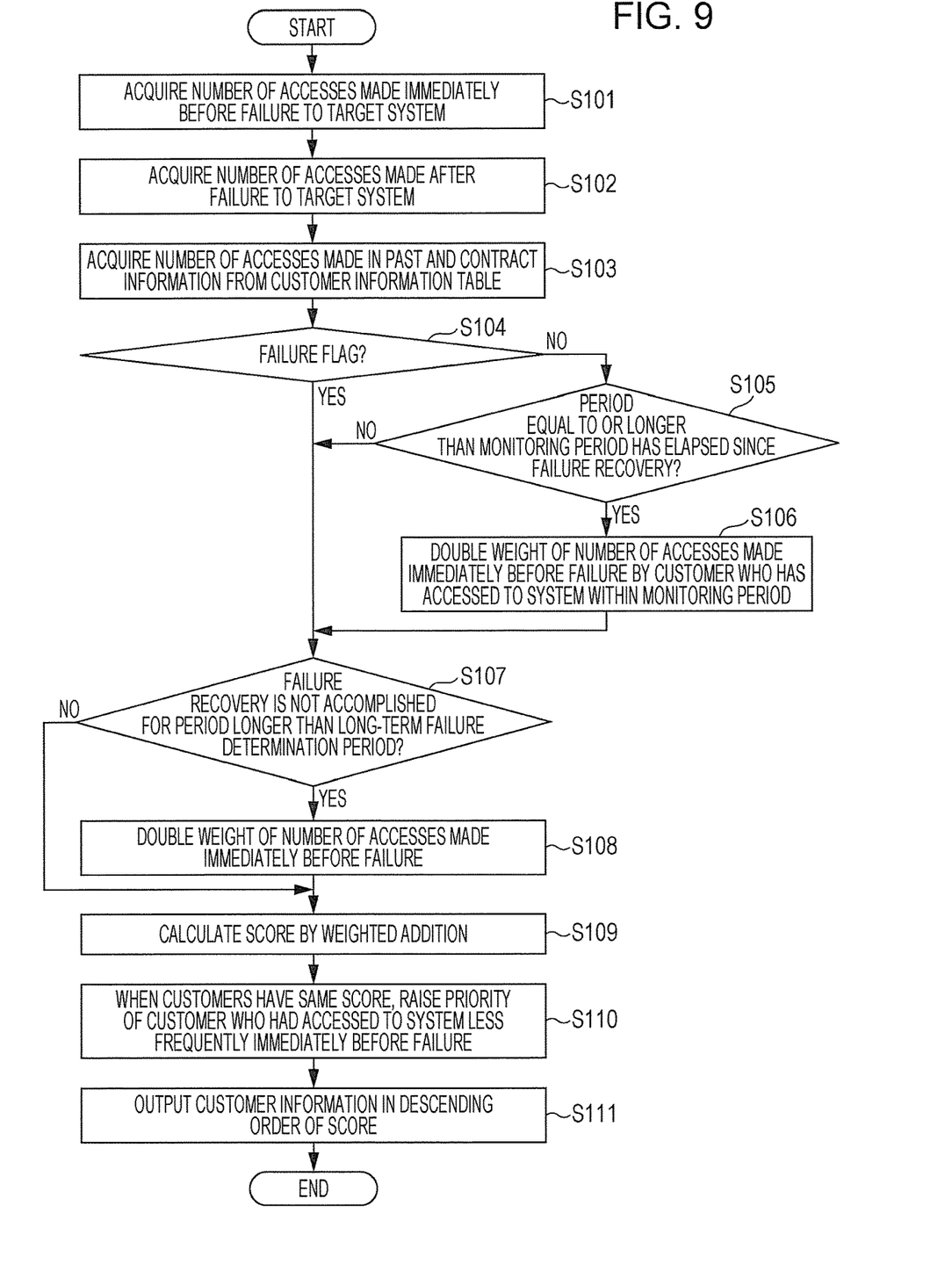
FIG. 9 is a flowchart illustrating a flow of processing that is performed when a failure occurs in the exemplary embodiment.

FIG. 9 is an example of a flowchart of processing that is performed by the customer management apparatus 10 when a failure occurs.

When a failure occurs in the system 100, the processor 14 refers to the second table, which is stored in the incident/failure information table database 28, and acquires the number of accesses made by each user to the system 100 immediately before the occurrence of the failure, the number of accesses after the occurrence of the failure, and the number of accesses at the time of occurrence of the last failure (S101 and S102).

In addition, the processor 14 refers to the customer information table, which is stored in the customer information table database 24, and acquires the number of accesses made by each user to the system 100 in the past month and contract information (S103). The contract information includes a contract period and the use or disuse of a trial version.

Next, the processor 14 determines whether a failure flag has been set (S104). The failure flag is set at the timing of occurrence of a failure and is cleared at the timing of recovery from the failure.

When a failure has occurred, and the system 100 has not been recovered from the failure, the failure flag remains set, and thus, the determination result in S104 is YES. The processor 14 determines whether the period of time during which failure recovery is not accomplished is longer than a long-term failure determination period (S107). Here, the long-term failure determination period is a predetermined period of time and is set to, for example, 30 minutes.

When it is determined that the duration of time over which failure recovery is not accomplished is longer than the long-term failure determination period (YES in S107), the processor 14 doubles the weight of the number of accesses made immediately before the occurrence of the failure (S108). When it is determined that the duration of time over which failure recovery is not accomplished is shorter than the long-term failure determination period (NO in S107), the processor 14 does not execute the process of S108 and maintains the weight as 1. This is because, when the failure recovery is not accomplished for a long period of time, it is presumed that a customer who uses the service more frequently is more affected by the failure than the other customers and needs to be given a higher support priority. Thus, the weight is increased when the failure recovery is not accomplished for a long period of time so as to raise the priority of such a customer who has accessed to the system 100 a large number of times immediately before the occurrence of the failure.

In contract, when the system 100 is recovered from the failure, the failure flag is cleared, and thus, the determination result in S104 is NO. In this case, the processor 14 determines whether a period of time that is equal to or longer than a monitoring period has elapsed since the failure recovery (S105). Here, the monitoring period is a predetermined period of time and is set to, for example, 10 minutes.

When a period of time that is equal to or longer than the monitoring period has elapsed since the failure recovery (YES in S105), the weight of the number of accesses made immediately before the occurrence of the failure by a customer who has accessed to the system 100 within the monitoring period is doubled (S106). The weight of a customer who has not accessed to the system 100 within the monitoring period is maintained as is. Then, the above-described process of S107 and the subsequent processes are executed.

After each weight has been adjusted in the manner described above, the processor 14 calculates a score for each customer by performing weighted addition using the acquired information (S109). In other words, the processor 14 calculates a score by using the following formula.

score=$a$·(number of accesses immediately before failure)+$b$·(number of accesses after failure)+$c$·(number of accesses at time of last failure)+$d$·(number of accesses in past month)+$e$·(contract period and use or disuse of trial version)

In the above formula, the letters a, b, c, d, and e respectively represent the weight of the number of accesses made immediately before occurrence of a failure, the weight of the number of accesses made after the occurrence of the failure, the weight of the number of accesses at the time of occurrence of the last failure, the weight of the number of accesses made in the past month, and the weight of a contract period and the use or disuse of a trial version. The relationship between the number of accesses made immediately before occurrence of a failure, the number of accesses made after the occurrence of the failure, the number of accesses at the time of occurrence of the last failure, and the number of points is defined by the table illustrated in FIG. 2. The relationship between the number of accesses made in the past month and the number of points is defined by the table illustrated in FIG. 3. The relationship between a contract period, the use or disuse of a trial version, and the number of points is defined by the table illustrated in FIG. 4. Thus, the processor 14 calculates a score for each customer by referencing to the above information items and the tables. For example, assume that the weights are set to satisfy a relationship of a=b=c=d=e=1 and that information items regarding a customer are as follows.

the number of accesses immediately before a failure=3
the number of accesses after the failure=2 (the customer has accessed to the system within the monitoring period)
the number of accesses at the time of the last failure=0
the number of accesses in the past month=less than 10
the contract period=less than 3 months
the use of a trial version=NO When the period of time during which failure recovery is not accomplished is shorter than the long-term failure determination period, since the weight a is doubled in the process of S106, the score is calculated as follows.

score=2·8+1·4+1·0+1·2+1·4=26

When the period of time during which failure recovery is not accomplished is longer than the long-term failure determination period, since the weight a is further doubled in the process of S108, the score is calculated as follows.

score=4·8+1·4+1·0+1·2+1·4=42

Assume that information items regarding another customer are as follows.

the number of accesses immediately before a failure=
the number of accesses after the failure=0 (the customer has not accessed to the system within the monitoring period)
the number of accesses at the time of the last failure=0
the number of accesses in the past month=less than 5
the contract period=less than 3 months
the use of a trial version=NO When the period of time during which failure recovery is not accomplished is shorter than the long-term failure determination period, since the weight a is maintained as 1, the score is calculated as follows.

score=1·2+1·0+1·0+1·1+1·4=7

When the period of time during which failure recovery is not accomplished is longer than the long-term failure determination period, since the weight a is doubled in the process of S108, the score is calculated as follows.

score=2·2+1·0+1·0+1·1+1·4=9

After the score for each customer has been calculated, the processor 14 determines whether there are customers having the same score. When there are customers having the same score, the processor 14 sets the priorities of these customers in such a manner that the customer who had accessed to the system 100 less frequently than the other customer immediately before the occurrence of the failure has a higher priority (S110). Obviously, this is an example, and when there are customers having the same score, the priorities of these customers may be determined in accordance with an arbitrary rule.

The processor 14 calculates the scores for the customers in the manner described above and extracts the customers in descending order of the scores. Then, the processor 14 outputs the extracted customer information to the processor 12. The processor 12 outputs the priorities given to the customers to the person 50, who is in charge of the operation of the system 100, and to the processor 16 (S111).

Figure 10:
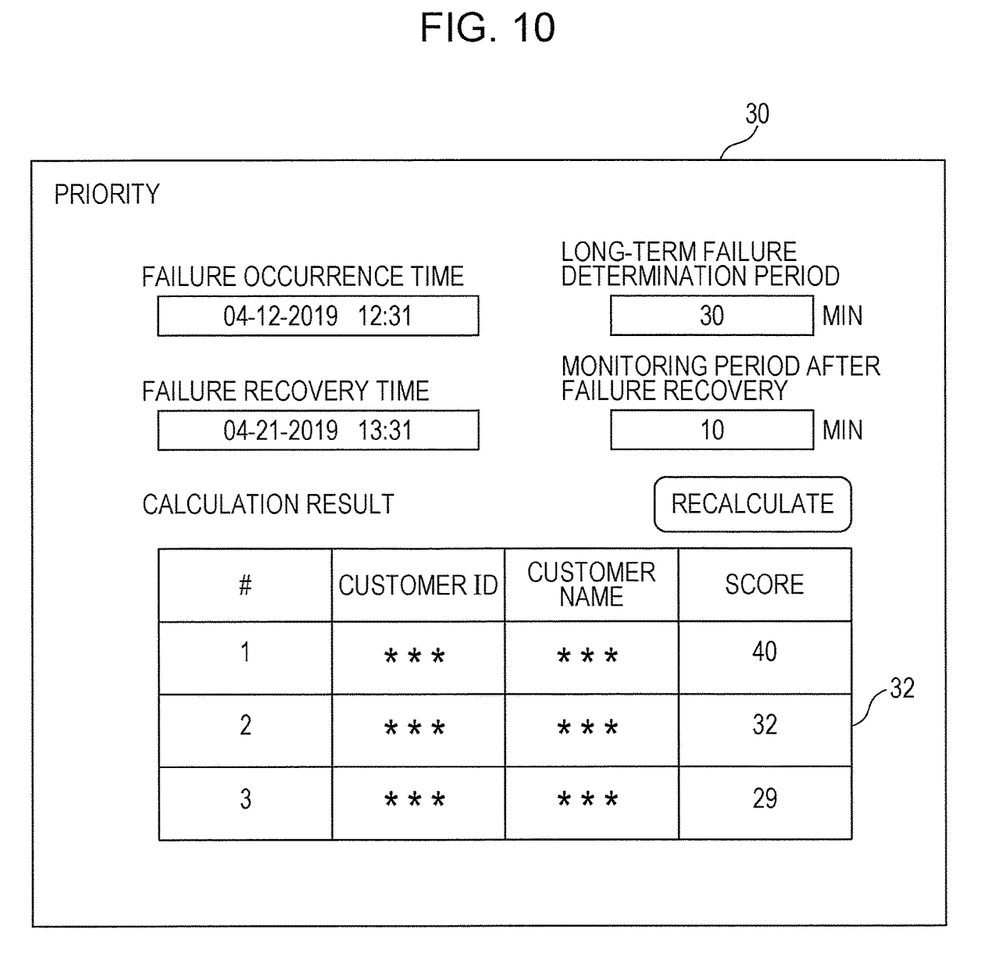
FIG. 10 is a diagram illustrating an output screen in the exemplary embodiment.

FIG. 10 illustrates an example of a screen 30 that is output to the person 50 by the processor 12 and on which the priority of each customer is displayed.

The time of occurrence of a failure, the time of failure recovery, the long-term failure determination period, and the monitoring period after failure recovery are displayed on the screen 30, and a table 32 of the priorities of the customers that have been calculated is displayed.

The time of failure recovery is displayed as a blank field during a period when failure recovery is not accomplished. When the time of failure recovery is displayed as a blank field, this indicates that the failure flag is set.

The long-term failure determination period is a determination period that is used in the process of S107, and the monitoring period after failure recovery is a monitoring time that is used in the process of S105.

In the table 32 of the priorities of the customers, the customers are displayed by being sorted in descending order of their scores, and more specifically, the priority, the customer ID, the name, and the calculated score of each customer are displayed.

Note that, as understood from the processing flow chart illustrated in FIG. 9, calculation of scores and calculation of the priorities of customers may be performed also during a period of time when failure recovery is not accomplished. Consequently, there is a possibility that results that are different from the calculation results obtained during a period of time when failure recovery is not accomplished may be obtained after the failure recovery has been accomplished, and thus, a recalculation button is displayed. When the person 50, who is in charge of the operation of the system 100, operates the recalculation button, the processor 12 instructs the processor 14 to perform recalculation, and the processor 14 recalculates the score of each customer in response to the instruction from the processor 12.

More specifically, regarding a customer who has accessed to the system 100 within the monitoring period after failure recovery, since recalculation is performed with the weight a that has been further doubled in the process of S106, the score of the customer increases, and the priority of the customer is raised.

<Modification>

In the present exemplary embodiment, a score is calculated by using the following formula.

score=$a$·(number of accesses immediately before failure)+$b$·(number of accesses after failure)+$c$·(number of accesses at time of last failure)+$d$·(number of accesses in past month)+$e$·(contract period and use or disuse of trial version)

However, these weights may be arbitrarily set. For example, a score may be calculated more easily by setting the weights b and c to satisfy a relationship of b=c=0 and by using the following formula.

score=$a$·(number of accesses immediately before failure)+$d$·(number of accesses in past month)+$e$·(contract period and use or disuse of trial version)

Alternatively, as the number of accesses after occurrence of a failure, two numbers of accesses, which are the number of accesses before failure recovery and the number of accesses after failure recovery may be used, and a score may be calculated by using the following formula.

score=$a$·(number of accesses immediately before failure)+$b1$·(number of accesses before failure recovery)+$b2$·(number of accesses after failure recovery)+$d$·(number of accesses in past month)+$e$·(contract period and use or disuse of trial version)

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A customer management apparatus comprising:
a detector that detects occurrence of a failure;
a memory that stores customer information; and
a processor,
wherein the processor is configured to, by running a program,
calculate a number of accesses made by each customer at time of occurrence of a failure when the detector detects the occurrence of the failure, and
output, based on the number of accesses, priorities of customers who are to be taken care of when a failure occurs, the priorities being stored in the memory.

2. The customer management apparatus according to claim 1,
wherein the processor is configured to
calculate a first number of accesses made by each of the customers within a first predetermined period of time before occurrence of a failure,
calculate a second number of accesses made by each of the customers within a second predetermined period of time after the occurrence of the failure, and
output the priorities of the customers who are to be taken care of when a failure occurs, which are stored in the memory, based on the first number of accesses and the second number of accesses.

3. The customer management apparatus according to claim 2,
wherein the processor is further configured to
output the priorities based on duration of time over which failure recovery is not accomplished.

4. The customer management apparatus according to claim 2,
wherein the processor is further configured to
calculate a third number of accesses made by each of the customers within a third predetermined period of time after occurrence of another failure that has occurred immediately before the occurrence of the failure, and
output the priorities based on the first number of accesses, the second number of accesses, and the third number of accesses.

5. The customer management apparatus according to claim 4,
wherein the processor is further configured to
output the priorities based on duration of time over which failure recovery is not accomplished.

6. The customer management apparatus according to claim 4,
wherein the processor is further configured to
calculate how many times each customer uses within a predetermined period of time, and
output the priorities based on the first number of accesses, the second number of accesses, the third number of accesses, and a number of uses by each customer.

7. The customer management apparatus according to claim 6,
wherein the processor is further configured to
output the priorities based on duration of time over which failure recovery is not accomplished.

8. The customer management apparatus according to claim 6,
wherein the processor is further configured to
calculate a contract period for each customer, and
output the priorities based on the first number of accesses, the second number of accesses, the third number of accesses, a number of uses, and the contract period.

9. The customer management apparatus according to claim 8,
wherein the processor is further configured to
output the priorities based on duration of time over which failure recovery is not accomplished.

10. The customer management apparatus according to claim 6,
wherein the processor is further configured to
determines use or disuse of a trial version by each customer, and
outputs the priorities based on the first number of accesses, the second number of accesses, the third number of accesses, a number of uses, the contract period, and the use or disuse of the trial version.

11. The customer management apparatus according to claim 10,
wherein the processor is further configured to
output the priorities based on duration of time over which failure recovery is not accomplished.

12. The customer management apparatus according to claim 1,
wherein the processor is further configured to
output the priorities based on duration of time over which failure recovery is not accomplished.

13. A non-transitory computer readable medium storing a program causing a computer to execute a process, the process comprising:
detecting occurrence of a failure;
calculating a number of accesses made by each customer at time of occurrence of a failure when the occurrence of the failure is detected; and
outputting, based on the number of accesses, priorities of customers who are to be taken care of when a failure occurs.

14. A customer management apparatus comprising: a plurality of processors configured for detecting an occurrence of a failure; storing customer information in a memory; and running a program, calculating a number of accesses made by each customer at time of occurrence of a failure when a detector detects the occurrence of the failure, and outputting, based on the number of accesses, priorities of customers who are to be taken care of when a failure occurs, the priorities being stored in the memory.

* * * * *